June 11, 1968 G. A. CARTER 3,387,639
TOMATO CORING MACHINE
Filed July 21, 1965 5 Sheets-Sheet 1

Fig. 1.

INVENTOR.
George A. Carter
BY
Popp and Sommer
ATTORNEYS

United States Patent Office 3,387,639
Patented June 11, 1968

---

3,387,639
TOMATO CORING MACHINE
George A. Carter, 328 S. Independence St., Tipton, Ind. 46072
Filed July 21, 1965, Ser. No. 473,731
7 Claims. (Cl. 146—52)

ABSTRACT OF THE DISCLOSURE

A succession of transverse rows of tomatoes are advanced with their cores vertical, past a holder for a transverse row of rotating vertical spindles carrying coring knives and spaced to core the tomatoes of each row. To move the knives, while operative, along with the advancing rows of tomatoes, the holder is actuated by a cross shaft having end crank pins on which the ends of a pair of upright rods are journalled and which carry the opposite ends of the holder. The opposite ends of this pair of rods is shown as having a sliding and swinging connection with the frame and the cross shaft and its crank pins are synchronized with the advancing rows to enter, move along with, and withdraw from the core of each tomato. The use of a cross shaft with its end crank pins insures identity in movement of opposite ends of the holder, which identity is difficult to obtain through separate trains of gearing.

---

This invention relates to a machine for coring tomatoes and the like, and more particularly to a machine which will successively core rows of tomatoes while moving at a substantially constant speed, the coring being from opposite ends of each tomato.

One of the principal objects is to provide a simple and inexpensive drive for moving at least one row of rotary coring knives into and out of coring engagement with each successive row of tomatoes so travelling at a substantially constant speed, this being accomplished by journalling a horizontal transverse crank shaft, having its crank pins at its ends, on the frame near a holder for the row of rotary coring knives, and by connecting each of these crank pins with the corresponding end of this rotary coring knife holder to move the holder in an orbital path conforming to the orbital movement of the crank pins, the use of a cross crank shaft for this purpose providing a simple means insuring uniformity in the orbital movement of the opposite ends of the rotary coring blade holder.

Another object of the invention is to provide a simple drive for the rotary coring knives journalled in the orbitally moving rotary coring knife holder, this being accomplished by a sprocket and chain drive which also includes a drive sprocket journalled in the rotary coring knife holder.

Another object of the invention is to provide a simple and inexpensive drive for the gang of rotary coring knives which also includes the means for supporting and orbitally moving the rotary coring knife holder, this being accomplished by supporting the rotary coring knife holder on upright rods, corresponding ends of which are moved in an orbital path, and one of which rods is also rotated and employed to drive the driving pinion so journalled in the rotary coring knife holder.

Other objects and advantages of the invention will be apparent from the following description and drawings in which.

Frame

The tomato coring machine of the present invention includes a stationary frame indicated generally at 10 which includes a tower section 10a from which a lower loading section 10b and a discharge section 10c protrude horizontally in opposite directions.

Conveyer

The frame supports an endless conveyer 11, the upper stretch of which is loaded with the tomatoes 12 and which carries these tomatoes through the tower section 10a in which they are cored. For this purpose the conveyor 11 includes a pair of endless chains 13 mounted on drive sprockets 14 fixed to a cross drive shaft 15 journalled in bearings 16 fixed to the tower section 10a of the frame above the unloading section 10c thereof. The opposite end of the drive chains 13 are supported on idler sprockets 18 fixed to an idler cross shaft 19 journalled at its opposite ends in adjustable bearing blocks 20 each slidably mounted between vertically spaced generally horizontal rails 21 carried by the loading frame section 10b. The adjustment of the bearing blocks 20 along their rails 21 toward and from the drive shaft 15 can be effected in any suitable manner, conventional chain tighteners being each shown as consisting of a U-shaped offset 22 on its bearing block 20 forming a pocket in which a rotary head 23 is arranged so that it can rotate about a horizontal axis intersecting the axis of the shaft 19. This rotary head 23 is fixed, as by a cross pin 24, to a horizontal screw 25 which which works in a nut 26 fixed to the frame section 10b. It will be seen that by turning either screw 25 it moves forwardly or backwardly in the nut 26, and since its removable head 23 can rotate in but in moving axially with reference to the companion bearing block 20, it moves this bearing block forwardly or rearwardly to loosen or tighten the companion chain 13 of the conveyer 11.

The two chains 13 have their upper and lower stretches suitably supported by the frame 10 and carry a succession of cross plates 28 which face upwardly on traversing the upper stretch of the conveyer 11 and are provided at their opposite ends with a plurality of spaced openings 29 arranged in a straight line extending along the center of each plate 28 and hence in a row extending transversely of the upper stretch of the conveyer 11. The top or operative surface of these cross plates 28 face upwardly on traversing the upward stretch of the conveyer 11 and the rims of the openings 29 form pockets into which the tomatoes 12 are placed, stem depression side up, either from the table top formed by an apron 31 on the end of the loading section 10b of the frame above the idler pulleys 18, or from the opposite sides of the loading section 10b of the frame.

The plates 28 are shown as unprovided at their centers with openings 29. Over these blank center parts of the plates a belt conveyer, shown by broken lines 32, can be provided, this belt conveyer forming a convenient means for bringing uncored tomatoes to within convenient reach of workers at the end table or apron 31 or along opposite sides of the feeding section 10b of the frame.

Figure 3:
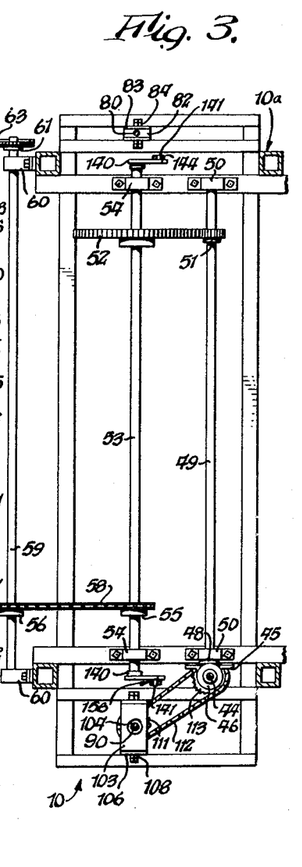
FIG. 3 is a fragmentary horizontal section taken generally on line 3—3, FIG. 1.

The conveyer 11 is driven by an electric motor 35 the pulley 36 of which is connected by a belt 38 with a pulley 39 on a cross shaft 40 journalled on bearings 41 at the top of the tower section 10a of the frame. A bevel pinion 42 is fixed to one end of this main drive shaft 40 and meshes with a bevel pinion 43. The bevel pinion 43 is fast to the upper end of a vertical shaft 44 journalled in bearings 45 at one side of the tower section 10a of the frame and near the lower end of this vertical shaft 44 a bevel pinion 46 fixed thereto meshes with a pinion 48 on a horizontal cross shaft 49 journalled in bearings 50. A pinion 51 is fixed to this horizontal cross shaft 49, as shown in FIG. 3, and meshes with a gear 52 fast to a bottom horizontal crank shaft 53 which is journalled in frame bearings 54. This bottom horizontal crank shaft 53, through sprockets 55, 56 and a chain 58, drives a horizontal cross shaft 59 journalled in frame bearings 60. Through sprockets 61, 62 and a chain 63, this drive is continued to the cross drive shaft 15 of the conveyer 11.

Coring mechanisms

This conveyer 11 therefore advances at a steady rate, that is, it is not a step-by-step conveyer, and as each row of tomatoes 12 contained within the openings 29 of a cross plate 28 of the conveyer 11 passes through the center of the tower section 10a of the frame, the upwardly facing stem depressions of the row of tomatoes are subjected to rotary coring knives 65 of a top coring mechanism 66 contained within a top coring knife holder 67. The downwardly facing flower sides of this row of tomatoes are also cored by the knives 68 of a bottom coring mechanism 69 contained within a bottom coring knife holder 70. These coring mechanisms are mounted and constructed as follows:

Confining attention to the mounting and drive for the top coring mechanism 66, the numeral 73 represents a pinion fast to the top horizontal drive shaft 40 and meshing with a gear 74 fast to a top horizontal crank shaft 75 journalled in bearings 76 on the upper end of the tower section 10 of the frame. At its opposite ends this top horizontal crank shaft 75 is provided with rotary crank members 78 each carrying a horizontal crank pin 79.

Figure 5:
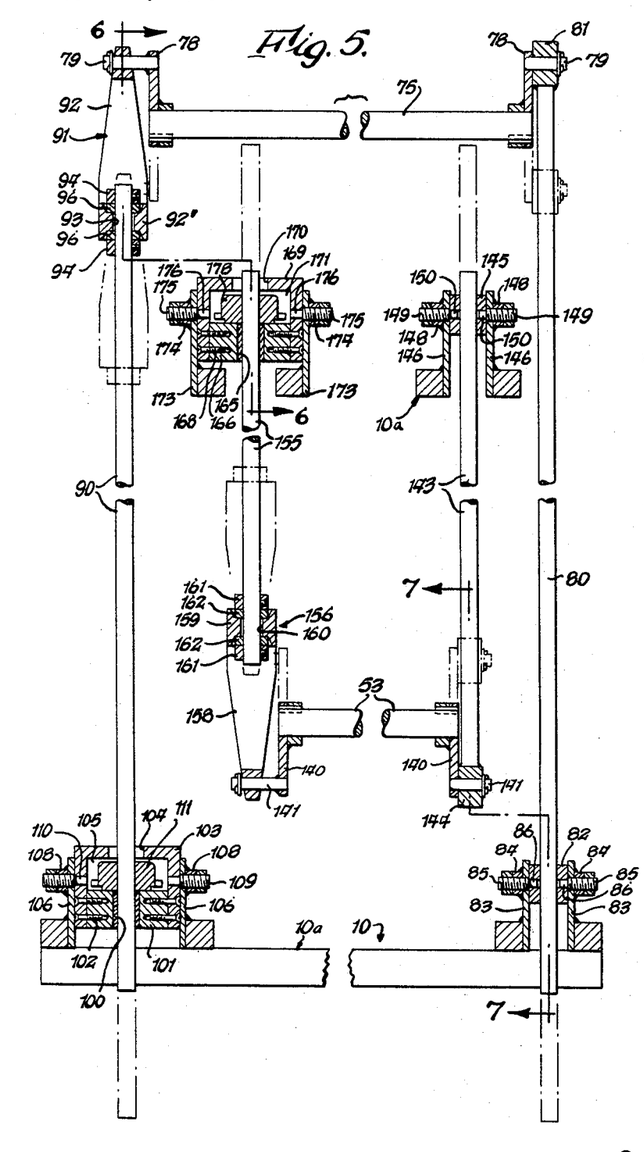
FIG. 5 is an enlarged fragmentary view similar to FIG. 4 and showing in particular the mechanisms for moving the top and bottom rotary coring knife holders into and out of the rows of tomatoes being moved along at a substantially constant speed by the conveyer of the coring mechanism.
Figure 6:
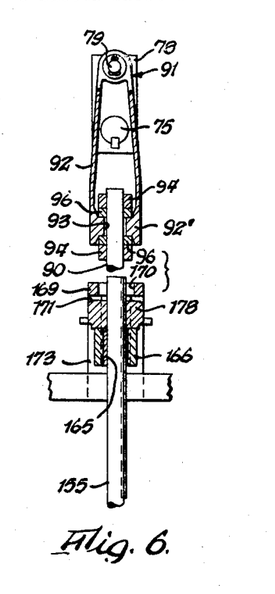
FIGS. 6 and 7 are fragmentary vertical sections taken generally along the corresponding lines on FIG. 5.

To one of these crank pins 79 is pivotally secured, as best shown in FIG. 5, an upright rod 80, this rod being provided with a bearing 81 at its upper end for this purpose. The lower end of this upright rod 80 is slidingly mounted in a bearing bushing 82. This bearing bushing 82 is mounted on the frame 10 for swinging movement about a horizontal axis extending transversely of the line of movement of the top stretch of the conveyer 11. For this purpose a pair of spaced supporting plates 83 are mounted on the frame and carry coaxial nuts 84 containing coaxial screws 85. The inner end of each of these screws is in the form of a bearing pin 86 on which the bearing bushing 82 is journalled. It will be seen that by so slidingly mounting the upright rod 80 in a bearing bushing 82 pivotally supported at 86 on an axis parallel with the top horizontal crank shaft 75, the crank pin 79 is free to work the upright rod 80 by swinging it horizontally and also moving it vertically.

An upright rod 90 is pivotally connected to the crank pin 79 at the opposite end of the top horizontal crank shaft 75, this connection being through a connector 91 which permits of adjusting the effective length of the upright rod 80. This connector can be of any suitable form but is shown as comprising a yoke 92 pivotally connected at its upper end to its crank pin 79 and having a cross head 92' at its lower end provided with a vertical through opening 93. The upper end of the upright rod 90 extends through this opening 93 and is secured to the cross head 92' by a pair of set screw collars 94, bearing bushings 96 being interposed between these collars and the cross head 92'. These bearing bushings permit the rod 90 to rotate about its axis for a purpose which will presently appear.

The lower end of the upright rod 90 is slidingly and rotatably mounted in a bearing bushing 100 contained within a bearing block 101. This bearing block is secured, as by screws 102, between the depending legs of an inverted U-shaped yoke 103, the cross part of this yoke having an opening 104 through which the upright rod 90 extends into the bearing bushing 100 and the cross part of this yoke 103 being spaced from the bearing block 101 as indicated at 105. This yoke 103 is pivotally mounted on the frame 10 which is provided with a pair of spaced parallel plates 106 carrying coaxial nuts 108 for this purpose. Each nut 108 carries a screw 109, these screws being formed at their opposing ends to provide bearing pins 110 on which the legs of the yoke 103 are journalled.

Figure 1:
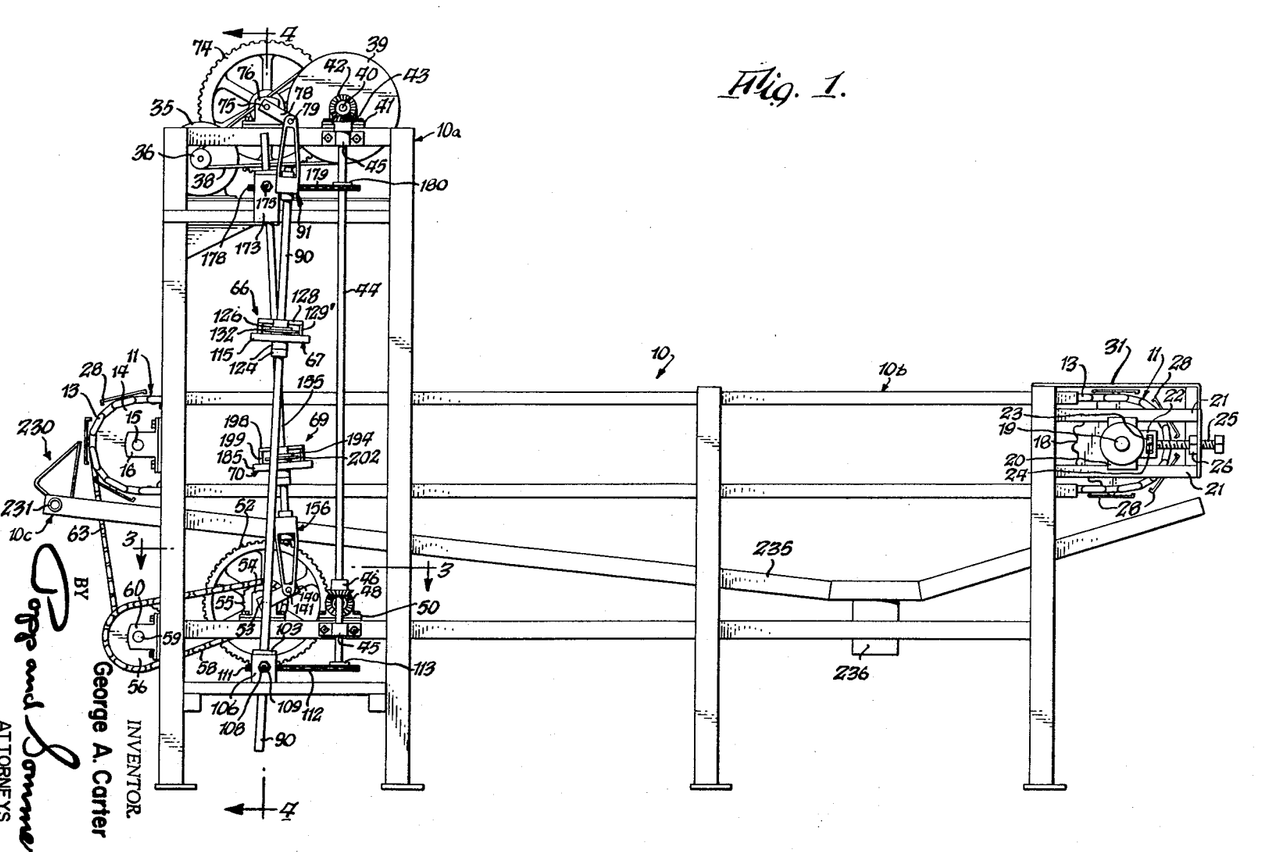
FIG. 1 is a side elevational view of a tomato coring machine embodying the present invention.

This upright rod 90 is continuously rotating and for this purpose has fixed thereto, within the space 105, a sprocket 111 arranged substantially coincident with the bearing pins 110. This sprocket is connected by a chain 112 (FIG. 1) to a sprocket 113 fixed to the lower end of the vertical drive shaft 44.

Figure 8:
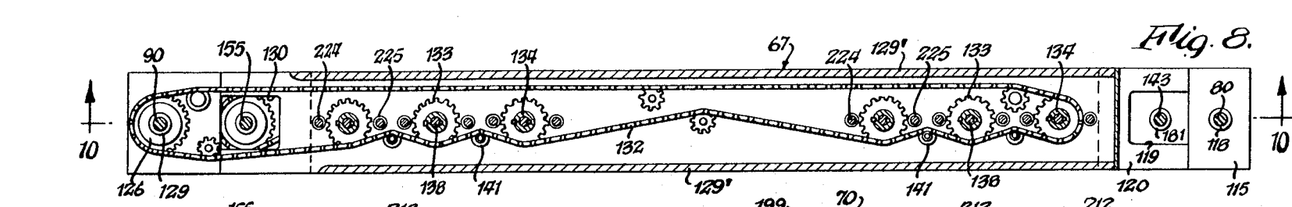
FIGS. 8 and 9 are horizontal sections taken on the correspondingly numbered lines of FIG. 4.
Figures 9, 10:
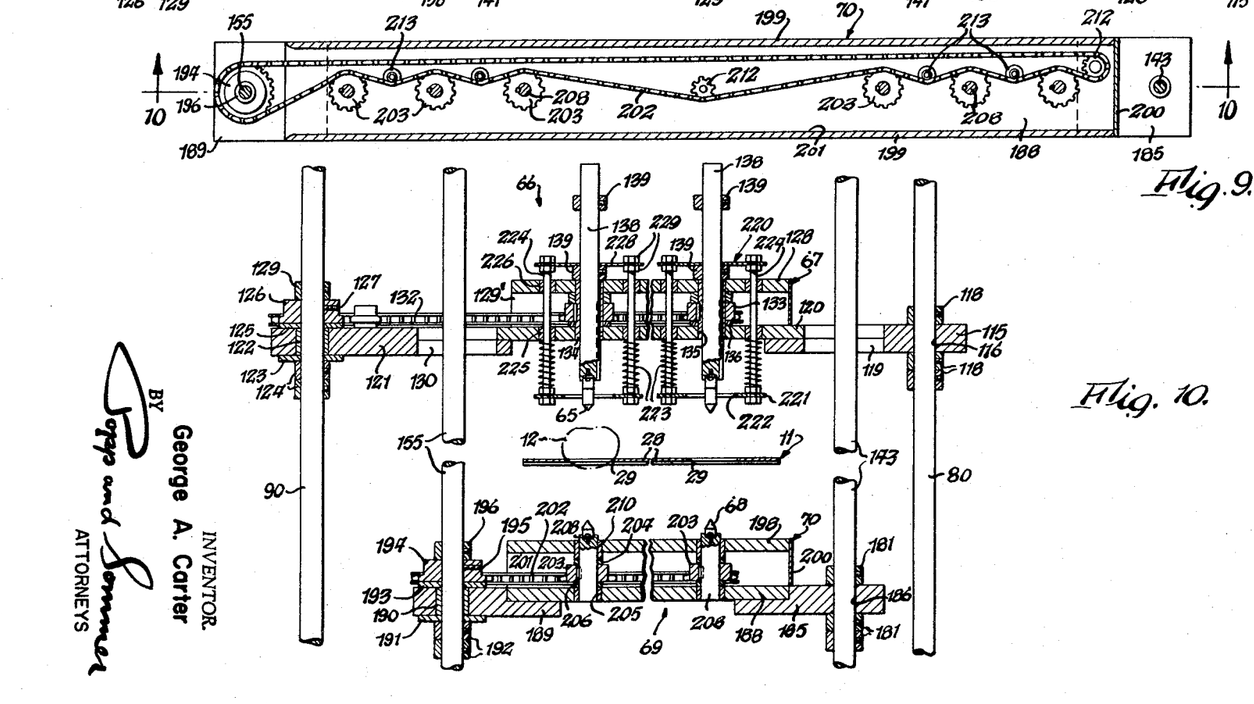
FIG. 10 is a vertical transverse section taken on line 10—10 of FIGS. 8 and 9.

The top coring mechanism 66 is mounted on these upright rods 80, 90 above the upper stretch of the conveyer 11 and its rotary knives 65 are driven through motion derived from the rotation of the rod 90. For this purpose this upper coring mechanism 66 is constructed as follows:

Referring to FIGS. 8 and 10 the numeral 115 represents an end supporting plate or block having an opening 116 through which the rod 80 extends and which is supported on this rod by means of set screw collars 118. This end holder 115 is provided with an opening 119 and supports a cross plate 120 forming part of the top coring knife holder 67 and extending toward the upright rod 90 at the opposite side of the machine. The opposite end of this plate 120 is supported from this upright rod 90 by an end holder 121 having a vertical bearing bushing 122 in which the upright rod 90 is journalled. This end holder 121 is supported by a step bearing 123 which in turn is supported on the rotating upright rod 90 by a pair of set screw collars 124.

The end holder 121 supports a step bearing 125 for a sprocket 126 which is fixed, as by a set screw 127, to the rotating upright rod 90. A set screw collar 129 is secured to the rotating upright rod 90 above this pinion 126. The top rotary coring knife holder 66 also includes a top plate 128 spaced above the bottom plate 120 by side walls 129'. The top rotary coring knife holder 121 is also provided with a vertical opening 130 for a purpose which will presently appear.

The sprocket 126 drives a chain 132 which in turn meshes with and drives sprockets 133 severally associated with and rotating the coring knives 65. For this purpose each sprocket 133 is keyed to a sleeve bearing 134 which is journalled in a bore 135 in the plate 120, each sprocket 133 also being supported on a step bearing 136. A vertical spindle 138 is keyed to each bearing 134 and is supported thereon by means of a set screw collar 139 on the upper end of each spindle 138. A second set screw collar 139 is also provided for cooperation with a tomato hold-down as hereinafter described. To the lower end of each of these spindles 138 is suitably secured a rotary coring knife 65, these coring knives being shaped to cut a tapered hole in the tomato to remove the upper part of its core.

The chain 132 passes around suitably arranged idler sprockets 140 and idler rollers 141, as best shown in FIG. 8, and serves to hold it in proper driving contact with its driving and driven sprockets 126, 133.

Figure 7:
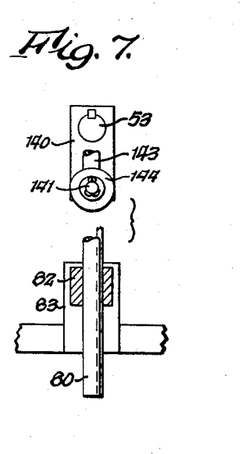

At its opposite ends the bottom crank shaft 53 is provided with rotary crank members 140 each carrying a horizontal crank pin 141. To one of these crank pins is pivotally secured, as best shown in FIGS. 5 and 7, an upright rod 143, this rod being provided with a bearing 144 at its lower end. For this purpose, the upper end of this upright rod 142 is slidingly mounted in a bearing bushing 145. This bearing is mounted on the frame 10 for swinging movement about a horizontal axis extending transversely of the line of movement of the top stretch of the conveyer 11. For this purpose a pair of spaced supporting plates 146 are mounted on the frame and carry coaxial nuts 148 containing coaxial screws 149. The inner end of each of these screws is in the form of a bearing pin 150 on which the bearing bushing 145 is journaled. It will be seen that by so slidingly mounting the upright rod 143 in a bearing bushing 145 pivotally supported at 150 on an axis parallel with the crank shaft 53, the crank pin 141 is free to work the upright rod 143 by swinging it horizontally and also moving it vertically.

An upright rod 155 is pivotally connected to the crank pin 141 at the opposite end of the crank shaft 53, this connection being through a connector 156 which permits of adjusting the effective length of the upright rod 155. This connector can be of any suitable form but is shown as comprising a yoke 158 pivotally connected at its lower end to its crank pin 141 and having a cross head 159 at its upper end provided with a vertical through opening 160. The lower end of the upright rod 155 extends through this opening 160 and is secured to this cross head 159 by a pair of set screw collars 161, bearing bushings 162 being interposed between these collars and the cross head 159. These bearing bushings permit the rod 155 to rotate about its axis for a purpose which will presently appear.

The upper end of the upright rod 155 is slidingly and rotatably mounted in a bearing bushing 165 contained within a bearing block 166. This bearing block is secured, as by screws 168, between the depending legs of an inverted U-shaped yoke 169, the cross part of this yoke having an opening 170 through which the upright rod 155 extends into the bearing bushing 165 and the cross part of this yoke 169 being spaced from the bearing block 166 as indicated at 171. This yoke 169 is pivotally mounted on the frame 10 which is provided with a pair of spaced parallel plates 173 carrying coaxial nuts 174 for this purpose. Each nut 174 carries a screw 175, these screws being formed at their opposing ends to provide bearing pins 176 on which the legs of the yoke 169 are journaled. This upright rod 155 is continuously rotating and for this purpose has fixed thereto, within the space 171, a sprocket 178 arranged substantially in a plane coincident with the bearing pins 176. This sprocket is connected by a chain 179 (FIG. 1) to a sprocket 180 fixed to the upper end of the vertical drive shaft 44.

These upright rods 143, 155 extend through the oversized holes 119 and 130 of the top coring mechanism 66, as best shown in FIG. 10, and the bottom coring mechanism 69 is mounted on these upright rods 143, 155 below the upper stretch of the conveyer 11, and the rotary knives of this bottom coring mechanism are driven through motion derived from the rotation of the rod 155. For this purpose this bottom coring mechanism 69 is constructed as follows:

Referring to FIGS. 9 and 10, the numeral 185 represents an end supporting plate or block having an opening 186 through which the upright rod 143 extends and which is supported on this rod by means of set screw collars 181. This end holder 185 supports one end of a cross plate 188 forming part of the coring knife holder 70 and extending toward the upright rod 155 at the opposite side of the machine. The opposite end of this plate 188 is supported from this upright rod 155 by an end holder 189 having a vertical bearing bushing 190 in which the upright rod 155 is journaled. This end holder 189 is supported by a step bearing 191 which in turn is supported on the rotating upright rod 155 by a pair of set screw collars 192.

The end holder 189 supports a step bearing 193 for a sprocket 194 which is fixed, as by a set screw 195, to the rotating upright rod 155. A set screw collar 196, is secured to the rotating upright rod 155 above this pinion 126. The bottom rotary coring knife holder 70 also includes a top plate 198 spaced above the bottom plate 188 by side walls 199 and an end wall 200 to provide a space 201 for a purpose which will presently appear.

The sprocket 194 drives a chain 202 which in turn meshes with and drives sprockets 203 in the space 201 and severally associated with and rotating the coring knife 68. For this purpose each sprocket 203 is keyed to a sleeve bearing 204 which is journaled in a bore 205 in the plate 188, each sprocket 203 also being supported on a step bearing 206. A vertical spindle 208 is keyed to each bearing 204 and is supported thereon. This spindle is also journaled in a bearing bushing 210 in the top plate 198 and at its upper end has secured thereto a rotary coring knife 68, these coring knives being shaped to cut a tapered hole in the tomato to remove the lower part of its core. The chain 203 passes around suitably arranged idler sprockets 212 and idler rollers 213, as best shown in FIG. 9 and which serve to put it in proper driving contact with its driving and driven sprockets 194, 203.

This chain 202 is arranged so as to rotate the bottom coring knives 68 in the opposite direction from the top coring knives 65, thereby to avoid any tendency for these plates to turn the tomato about its axis.

*Tomato hold-downs*

During the coring operation from its top and bottom, each tomato 12 is yieldingly pressed downwardly into its opening 29 of the transverse plate 28 of the conveyer 11, this being to insure exact coring by the knives 65, 68 through the axes of the tomatoes 12. To this end the top coring mechanism 68 is provided with a plurality of tomato hold-downs, indicated generally at 220, associated with each rotary coring blade 65, and shown as constructed as follows:

The numeral 221 represents a flat ring below the bottom plate 120 of the top coring mechanism 66 in coaxial relation with each of the rotary cutter blades 65. This ring is provided with a relatively large central opening 222 which enables the companion cutter blade 65 to get at the tomato but this opening being small enough so that the ring will engage the top of the tomato 12 in order to hold it seated in its opening 29.

To this end each ring is pressed downwardly by a plurality of helical compression springs 223 each surrounding a bolt 224 which is slidingly seated in vertically aligning flat bearing bushings 225 and 226 in the bottom and top plates 198, 120, respectively. The upper ends of these bolts of each hold-down are fixed to a cross plate 228 by means of a pair of nuts 229. The center of each of these plates is slidable vertically on the corresponding cutter plate spindle 138. The bottom of each plate 228 engages the top of the collar 139 on the spindle 138 to limit the downward movement of the hold-down plate 221 and the upward movement of this hold-down plate is limited by the collar 139 fixed to its spindle 138.

*Discharge of tomato juice and corings*

As the transverse rows of tomatoes 12 travel along the discharge end 10c of the frame, the plates 28 on which they are mounted pass around the descending sides of the sprockets 14 thereby to topple the tomatoes contained in their openings onto a grid indicated generally at 230 and which comprises a plurality of inverted V-shaped bars arranged in parallel spaced relation transversely across the unloading section 10c of the main frame. The depending legs of these V-shaped bars also preferably have between them a horizontal tranverse spray pipe 231 from which jets of water spray upwardly against the passing cored tomatoes.

A pan 235 which slopes down to a discharge 236 is arranged under the conveyer 11 to catch corings, tomato juice and anything else, such as stems and leaves, falling from the tomatoes being processed.

*Operation*

In the operation of the tomato coring machine, the transverse plates 28 on the top stretch of the endless conveyer 11 are being advanced from the loading apron 31 on the loading section 10b of the frame, through the tower section 10a of the frame to the discharge section 10c thereof. Tomatoes are manually loaded individually in the openings 29 with their stem side up and centered in relation to the pockets. The conveyer 11 is in continuous operation, being driven from the motor 35 through the drive comprising the elements 36, 38, 39, 40, 42, 43, 44, 46, 48, 49, 51, 52, 53, 55, 58, 56, 59, 61, 63 and 62, the latter being a sprocket on the drive shaft 15 of the conveyer.

As each row of tomatoes on a cross plate 28 of the conveyer 11 approaches the center of the tower section 10a of the frame, the row comes between the top and bottom coring mechanisms 66, 69 which are moving toward each other and also are moving in the direction of movement of the row of tomatoes along the conveyer toward the discharge end of the machine.

Figure 2:
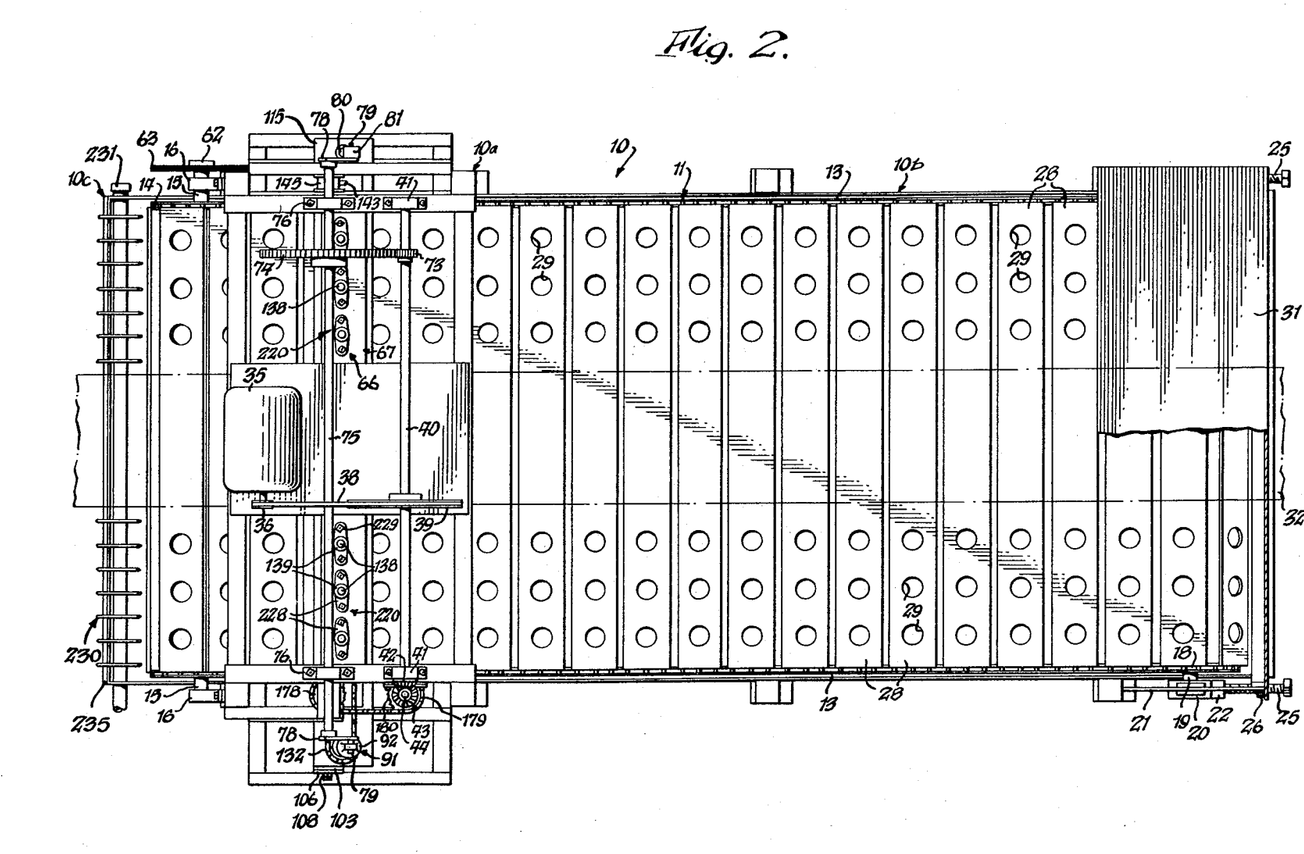
FIG. 2 is a top plan view thereof with parts broken away.

This movement of the top coring mechanism 66 is due to the mounting of this top conveyer mechanism 66 on the upright rods 80, 90 so that this top coring mechanism is moved in an orbital path in response to the orbital movement of the upper portions of these upright rods. This orbital movement of the upper portions of these upright rods on which the top coring mechanism 66 is mounted is effected by the rotary crank members 79, 79 of the top frame journalled crank shaft 75 which is rotated in timed relation with the conveyer 11 from the motor 35 by the drive elements 36, 38, 39, 40, 73 and 74, as shown in FIG. 2. This orbital movement of the upper end of the upright rods 80, 90 is permitted by virtue of the sliding mounting of the lower ends of these rods in the bearing bushings 82, 100, respectively, and which bearing bushings are pivotally mounted on the frame 10 to permit horizontal movement of these upright rods by the pivot pins 86, 110, respectively.

This orbital movement of the bottom coring mechanism 69 mounted on the lower ends of the upright rods 143, 155 is effected by the rotary crank pins 141, 141 of the bottom crank shaft 53. This bottom crank shaft is driven in timed relation to the conveyer 11 and to the top coring mechanism 66 from the motor 35 by the drive composed of the elements 36, 38, 39, 40, 42, 43, 44, 48, 49, 51 and 52, this last element being a gear fixed to this crank shaft 53. Such orbital movement of the lower ends of the upright rods 143, 155 is permitted by their sliding mounting in the bearing bushings 145, 165, respectively, and which bearing bushings are pivotally mounted on the pivot pins 150, 176, respectively, to permit horizontal swinging movement of the lower ends of these upright rods 143, 155.

The timing of the top and bottom coring mechanisms 66, 69 with reference to each other and with reference to the conveyer 11 is such that as a row of tomatoes on the plate 28 of the conveyer 11 approach the zone of action between these coring mechanisms, these coring mechanisms move toward each other and also in the direction of movement of the row of tomatoes on the conveyer so as to cause their knives 65, 68 to enter the tops and bottoms of the cores of the row of tomatoes moving along with the upper stretch of the conveyer. This orbital movement of these coring mechanisms 66, 69 then continues to move the knives 65, 68 out of the passing row of tomatoes and still in the direction of movement of this row along with the upper stretch of the conveyer so that the row of tomatoes is cored while moving at a substantially constant speed along with the conveyer and with, in effect, only vertical movement of these coring knives with reference to the conveyed row of tomatoes.

These coring knives 65 and 68 are constantly rotating, the rotation of each top knife 65 being in the opposite direction from that of its companion bottom knife 68. These knives are also driven from the motor 35, the drive elements from this motor to the gang of upper coring knives 65 being 36, 38, 39, 40, 42, 43, 44, 113, 112, 111, 90, 126, 132, 133 and 138, the latter being the spindles carrying the top knives 65. The drive from the motor to the bottom knives 68 comprises the drive elements 36, 38, 39, 40, 42, 43, 44, 180, 179, 178, 155, 194, 202, 203 and 208, the latter being the spindles carrying these knives 68.

Figure 4:
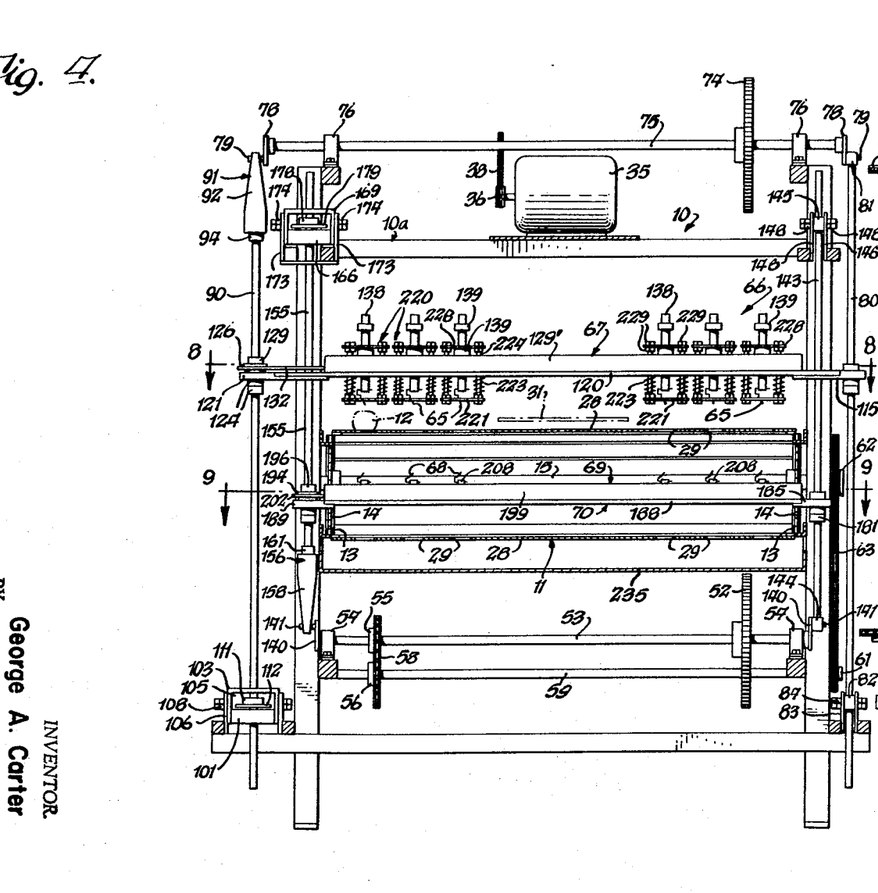
FIG. 4 is a vertical transverse section taken generally on line 4—4, FIG. 1.

During such cutting action by the knives 65, 68, each tomato 12 is held firmly in its opening 29 by its spring loaded hold-down ring 221 which, as shown in FIGS. 4 and 10, descends with the top coring mechanism 66 to engage the top of the tomato and gently press it into its hole 29 during the coring operation. This movement is permitted by the helical compression springs 223 which permit upward sliding movement in the bearings 225, 226 of the vertical rods 224 which carry the presser rings 221, these bearings being mounted in the bottom and top plates 120, 198 of the top coring mechanism holder 67. The movement of these rings is limited by the set screw collars 139 on the spindles 138.

The pairs of top and bottom coring knives 65, 68 are rotated in opposite directions by virtue of the arrangement of the drive chains 132 and 202 in the manner illustrated in FIGS. 8 and 9.

From the foregoing it will be seen that the coring machine of the present invention comprises the frame 10; the conveyer 11 on this frame including the cross plates 28 and their openings 29 which carry a succession of transverse rows of equally spaced tomatoes 12 with their cores arranged generally parallel with one another and extending generally perpendicular to the line of movement of the top stretch of the conveyer 11; and means 35, 36, 38, 39, 40, 42, 43, 44, 46, 48, 49, 51, 52, 53, 58, 56, 59, 61, 63, 62, 15 and 14, driving this conveyer 11 at a substantially constant speed. The coring machine also includes the rotary coring knife holder 67 arranged in vertically spaced relation to the top stretch of the conveyer 11 and generally parallel with the transverse rows of tomatoes 12 carried thereby; the row of coring knives 65 each rotatably mounted on the rotary coring knife holder 67 for rotation about axes generally parallel with the cores of, and with their cutting ends directed toward, the passing rows of tomatoes 12, these knives 65 being spaced from one another severally to register with the cores of the tomatoes 12 of each passing row; and the means 126, 132, 133 and 138 rotating these coring knives 65 in unison. The coring machine also includes the means 73, 74, 75, 79, 80 and 9 moving the rotary cutting knife holder 67 to core each passing row of tomatoes, in timed relation to the above driving means for the conveyer 11 and moving the row of knives 65 simultaneously into the core of and also in the direction of movement of each row of tomatoes on the conveyer 11 and then simultaneously out of and still in the direction of movement of the row of tomatoes on the conveyer so that the row of tomatoes is cored while being moved at a substantially constant speed by the conveyer.

It will therefore be seen that the present invention achieves the various objects and has the advantages initially set forth.

What is claimed is:

1. A coring machine for tomatoes and the like, comprising a frame, a conveyer on said frame adapted to convey a succession of transverse rows of tomatoes arranged in predetermined positions along each row with their cores arranged generally parallel with one another and extending generally perpendicular to the line of movement of said conveyer, a rotary coring knife holder arranged in vertically spaced relation to said conveyer and generally parallel with the transverse rows of tomatoes carried thereby, a row of coring knives rotatably mounted on said the rotary coring knife holder for rotation about axes generally parallel with the cores of and with their cutting ends directed toward the passing rows of tomatoes, said coring knives being spaced from one another severally to register with the cores of the tomatoes of each passing row, means adapted to rotate said knives in unison, and means moving said coring knife holder to core each passing row of tomatoes, comprising a generally horizontal cross shaft arranged adjacent said coring knife holder and journalled on said frame transversely of said conveyer, generally coaxial crank pins at the opposite ends of said cross shaft, means connecting each of said crank pins with the corresponding end of said rotary coring knife holder to move said rotary coring knife holder in an orbital path conforming to the orbital movement of said crank pins and means driving said conveyer and cross shaft in timed relation to each other to move said row of coring knives simultaneously into the cores of and also in the direction of movement of each row of tomatoes along with said conveyer and then simultaneously out of and still in the direction of movement of each row of tomatoes along with said conveyer whereby each row of tomatoes can be cored while being moved at a substantially constant speed by said conveyer.

2. A coring machine for tomatoes and the like, comprising a frame, a conveyer on said frame adapted to convey a succession of transverse rows of tomatoes arranged in predetermined positions along each row with their cores arranged generally parallel with one another and extending generally perpendicular to the line of movement of said conveyer, a rotary coring knife holder arranged in vertically spaced relation to said conveyer and generally parallel with the transverse rows of tomatoes carried thereby, a row of coring knives rotatably mounted on said rotary coring knife holder for rotation about axes generally parallel with the cores of and with their cutting ends directed toward the passing rows of tomatoes, said coring knives being spaced from one another severally to register with the cores of the tomatoes of each passing row, means adapted to rotate said knives in unison, and means moving said coring knife holder to core each passing row of tomatoes, comprising a generally horizontal cross shaft arranged adjacent said coring knife holder and journalled on said frame transversely of said conveyer, generally coaxial crank pins at the opposite ends of said cross shaft, an upright rod, means journalling one end of each upright rod on the corresponding crank pin, means providing a swinging and sliding connection between the opposite end of each upright rod and said frame, means mounting the corresponding end of said holder on an intermediate portion of the corresponding upright rod, thereby to move said rotary coring knife holder in an orbital path conforming to the orbital movement of said crank pins, and means driving said conveyer and cross shaft in timed relation to each other to move said row of coring knives simultaneously into the cores of and also in the direction of movement of each row of tomatoes along with said conveyer and then simultaneously out of and still in the direction of movement of each row of tomatoes along with said conveyer whereby each row of tomatoes can be cored while being moved at a substantially constant speed by said conveyer.

3. A coring machine as set forth in claim 2 wherein said means mounting the corresponding end of said holder on an intermediate portion of said upright rod comprises a collar on said upright rod and means adjustably fixing each collar at a selected position along its rod.

4. A coring machine for tomatoes and the like, comprising a frame, a conveyor on said frame adapted to convey a successsion of transverse rows of tomatoes arranged in predetermined positions along each row with their cores arranged generally parallel with one another and extending generally perpendicular to the line of movement of said conveyer, a rotary coring knife holder arranged in vertically spaced relation to said conveyer and generally parallel with the transverse rows of tomatoes carried thereby, a row of coring knives rotatably mounted on said the rotary coring knife holder for rotation about axes generally parallel with the cores of and with their cutting ends directed toward the passing rows of tomatoes, said coring knives being spaced from one another severally to register with the cores of the tomatoes of each passing row, means adapted to rotate said knives in unison, and means moving said coring knife holder to core each passing row of tomatoes, comprising coaxial cranks arranged at each side of said frame with their axes extending transversely of said conveyer and having coaxial crank pins, an upright rod at each side of the said frame adjacent the end of said coring knife holder, means journalling one end of each upright rod on the corresponding crank pin, means providing a swinging and sliding connection between the opposite end of each upright rod and the frame, means mounting the corresponding end of said rotary coring knife holder on an intermediate portion of the corresponding upright rod to move said rotary coring knife holder in an orbital path conforming to the orbital movement of said crank pins, and means driving said conveyer and cranks in timed relation to each other to move said row of coring knives simultaneously into the cores of and also in the direction of movement of each row of tomatoes along with said conveyer and then simultaneously out of and still in the direction of movement of each row of tomatoes along with said conveyer whereby each row of tomatoes can be cored while being moved at a substantially constant speed by said conveyer.

5. A coring machine for tomatoes and the like, comprising a frame, a conveyer on said frame adapted to convey a succession of transverse rows of tomatoes arranged in predetermined positions along each row with their cores arranged generally parallel with one another and extending generally perpendicular to the line of movement of said conveyer, a rotary coring knife holder arranged in vertically spaced relation to said conveyer and generally parallel with the transverse rows of tomatoes carried thereby, a row of coring knives rotatably mounted on said the rotary coring knife holder for rotation about axes generally parallel with the cores of and with their cutting ends directed toward the passing rows of tomatoes, said coring knives being spaced from one another severally to register with the cores of the tomatoes of each passing row, means adapted to rotate said knives in unison, and means moving said coring knife holder to core each passing row of tomatoes, comprising coaxial cranks arranged on opposite sides of said frame with their axes extending transversely of said conveyer and having coaxial crank pins, an upright rod at each side of the frame adjacent the end of said coring knife, means journalling one end of one of said upright rods on a corresponding crank pin, means providing a swinging and sliding connection between the opposite end of said one of said upright rods and the frame, means mounting the corresponding end of said rotary coring knife holder on an intermediate portion of said one of said upright rods to move said corresponding end in an orbital path corresponding to the orbital path of its crank pin, means including a bearing permitting rotation of said other of said rods about its axis, journalling the one end of the other of said upright rods on the opposite crank pin, means, providing a rotary, swinging and sliding connection between the opposite end of said other of said upright rods and the frame, means, including a bearing permitting rotation of said another of said rods about its axis, mounting the opposite end of said rotary coring knife holder on an intermediate portion of said other of said rods to move said opposite end of said rotary coring knife holder in an orbital path corresponding to the orbital movement of its crank pin, means driving said conveyer and cranks in timed relation to each other to move said row of coring knives simultaneously into the cores of and also in the direction of movement of each row of tomatoes along with said conveyer, and then simultaneously out of and still in the direction of movement of each row along with said conveyer whereby each row of tomatoes can be cored while being moved at a constant speed by said conveyer, means rotating said other of said upright rods about its axis, and means actuating said rotating means for said knives in response to the rotation of said other of said upright rods.

6. A coring machine as set forth in claim 5 wherein said means rotating said other of said rods comprises a sprocket operatively connected thereto generally in line with the axis of its swinging connection to said frame, and a drive chain meshing with the teeth of said sprocket.

7. A coring machine for tomatoes and the like, comprising a frame, a conveyer on said frame adapted to convey a succession of transverse rows of tomatoes arranged in predetermined positions along said row and with their cores arranged generally parallel with one another and extending generally perpendicular to the line of movement of said conveyer, means driving said conveyer at a substantially constant speed, a rotary coring knife holder arranged in vertically spaced relation to said conveyer and generally parallel with the transverse rows of tomatoes carried thereby, a plurality of parallel rotary knife spindles journalled in said holder in a row in line with said cores of said rows of tomatoes, coring knives severally mounted on the corresponding ends of said spindles and adapted to core the tomatoes of each row on said conveyer, crank shaft means extending transversely of said conveyer and journalled horizontally on said frame in vertically alined relation to said holder and having alining crank pins at opposite sides of the frame, a first upright rod having one end journalled on one side of said crank pins, means supporting the other end of said first upright rod on said frame for longitudinally sliding and also swinging movement about an axis parallel with the axis of said crank shaft means whereby an intermediate part of said first rod moves in an orbital path conforming to the path of said one of said crank pins, a second upright rod having one end journalled on the other of said crank pins for rotation about its own axis and the axis of its crank pin, means supporting the other end of said second upright rod on said frame for longitudinally sliding and axial rotary movement and also swinging movement about an axis parallel with the axis of said crank shaft means whereby an intermediate part of said second rod moves in an orbital path conforming to the path of said other of said crank pins, means supporting the opposite ends of said holder on said intermediate parts of said rods, means synchronized with said conveyer driving said crank shaft means and moving said knives on said holder into the cores of and also in the direction of movement of each row of tomatoes along with said conveyer and thence simultaneously out of and still in the direction of movement of each row of tomatoes along with said conveyer whereby each row of tomatoes can be cored while being moved at a substantially constant speed by said conveyer, means rotating said spindles through motion derived from said second rod, and means rotating said second rod.

References Cited
UNITED STATES PATENTS

| | | | |
|---|---|---|---|
| 2,681,088 | 6/1954 | Kruppet et al. | 146—52 X |
| 2,788,037 | 4/1957 | Carter | 146—52 |
| 3,016,076 | 1/1962 | Keesling | 146—52 |
| 3,036,612 | 5/1962 | Wilkerson | 146—52 |
| 3,186,459 | 6/1965 | Van Raay | 146—52 X |

JAMES M. MEISTER, *Primary Examiner.*